United States Patent [19]

Fenton et al.

[11] 4,315,903
[45] Feb. 16, 1982

[54] REDUCING THE CONSUMPTION OF ANTHRAQUINONE DISULFONATE IN STRETFORD SOLUTIONS

[75] Inventors: Donald M. Fenton, Anaheim; Raoul P. Vaell, Los Angeles, both of Calif.

[73] Assignee: Union Oil Company of California, Calif.

[21] Appl. No.: 830,575

[22] Filed: Sep. 6, 1977

Related U.S. Application Data

[62] Division of Ser. No. 579,311, May 21, 1975, Pat. No. 4,060,594.

[51] Int. Cl.³ .................. C01B 17/05; B01D 53/34
[52] U.S. Cl. ............... 423/573 R; 423/226; 423/471
[58] Field of Search .......... 423/220, 224, 226, 571, 423/573 G, 573 L, 574 G, 574 L

[56] References Cited

U.S. PATENT DOCUMENTS

| | | | |
|---|---|---|---|
| 3,752,877 | 8/1973 | Beavan | 423/573 |
| 3,812,243 | 5/1974 | Landrum et al. | 423/574 |
| 3,928,535 | 12/1975 | Schulz | 423/226 |
| 3,959,542 | 5/1976 | Espenscheid et al. | 423/573 G |
| 4,060,594 | 11/1977 | Fenton et al. | 423/573 R |

FOREIGN PATENT DOCUMENTS 49-134565 of 1974 Japan .
948270 1/1964 United Kingdom ............... 423/226

OTHER PUBLICATIONS

Nicklin, "Hydrogen Sulfide Removal by the Stretford Liquid Prrification Process," Institute of Gas Engineers, Publication No. 593, May 1961.
Moyes et al., "Development of the Holmes-Stretford Process," The Chemical Engineer, Feb. 1974, pp. 84–90.
Smith, "The Sequestration of Metals," Chapman and Hall, Ltd. London, 1959, pp. 106–109, 113.

Primary Examiner—Earl C. Thomas
Attorney, Agent, or Firm—Dean Sandford; Daniel R. Farrell

[57] ABSTRACT

A process for treating a hydrogen sulfide-containing hydrogenated Claus process tail gas to convert the hydrogen sulfide to elemental sulfur in which said gas is contacted with an aqueous alkaline solution containing a water-soluble metal vanadate, a water-soluble anthraquinone disulfonate, and a water-soluble, inorganic fluoride, borate, or phosphate complexing agent to yield an effluent gas to reduced sulfur content. The solution is thereafter regenerated by contact with an oxygen-containing gas, elemental sulfur is recovered from the solution, and the regenerated solution is recycled to the gas-contacting step. The complexing agent contained in the solution reduces the chemical consumption of the anthraquinone disulfonate.

5 Claims, 1 Drawing Figure

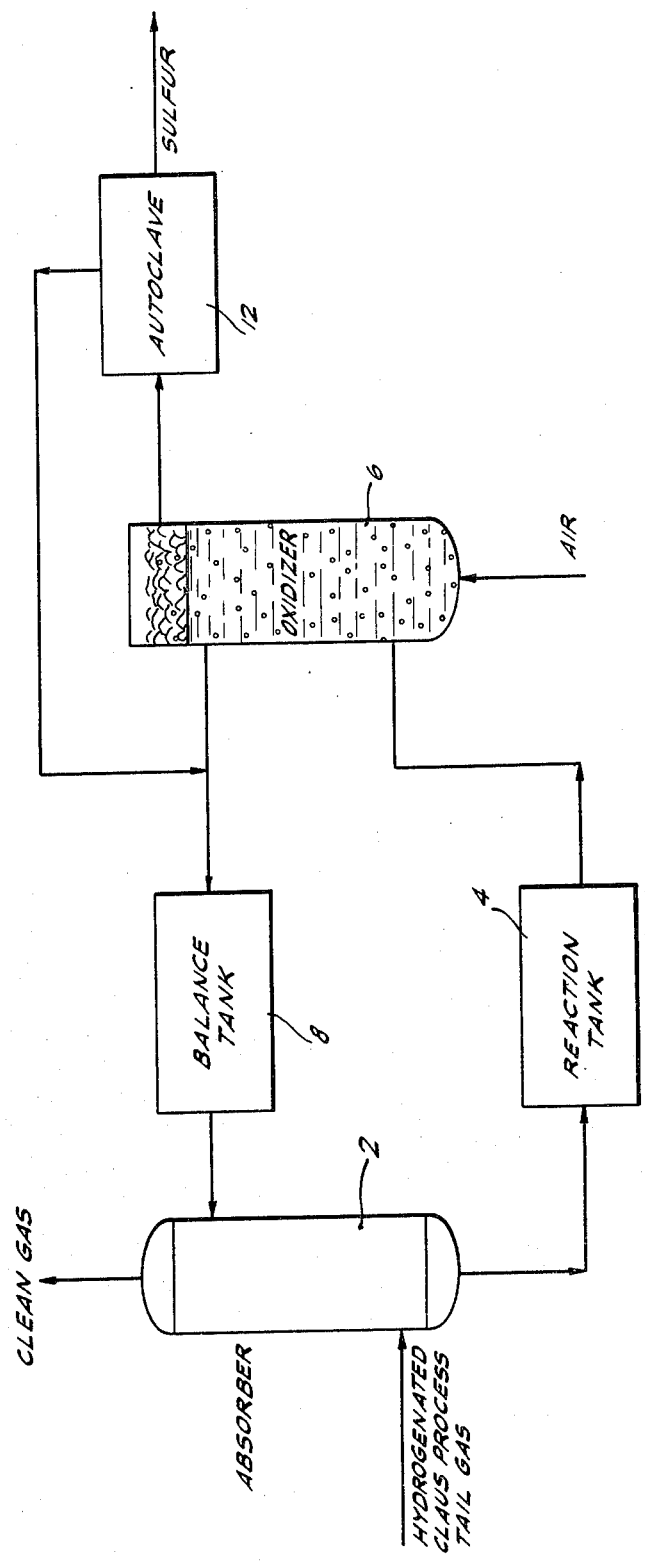

REDUCING THE CONSUMPTION OF ANTHRAQUINONE DISULFONATE IN STRETFORD SOLUTIONS

This is a division, of application Ser. No. 579,311, filed May 21, 1975 now Pat. No. 4,060,594.

BACKGROUND OF THE INVENTION (1) Field of the Invention

This invention relates to the removal of hydrogen sulfide from gases, and more particularly to a process for removing hydrogen sulfide from hydrogenated Claus process tail gas in which the hydrogen sulfide is converted to elemental sulfur.

(2) Description of the Prior Art

With the increasing concern over the pollution of the atmosphere, great demands have been made on industry to produce pollution-free products and to do so in a pollution-free manner. One area of particular concern has been the release of sulfur and its compounds into the atmosphere during the refining of petroleum, the sweetening of natural gas, the processing of ore, the destructive distillation of coal, and other processes which produce sulfur-containing gases.

The Claus process is widely employed for the desulfurization of hydrogen sulfide-containing gases and is about 90 to 97 percent effective in converting hydrogen sulfide to elemental sulfur. While substantial amounts of sulfur are recovered and, thus, prevented from being released into the atmosphere, in many instances it is necessary to further treat the Claus process tail gas to make it acceptable for discharge into the atmosphere. One process particularly useful for treating these tail gases is the Beavon sulfur removal process described in U.S. Pat. No. 3,752,877, which process involves the hydrogenation of the Claus process tail gas to convert the various sulfur compounds to hydrogen sulfide, and then employing a process, known as the Stretford process, to remove the remaining hydrogen sulfide. The Stretford process is a well-known process for converting hydrogen sulfide to elemental sulfur and is described in U.S. Pat. Nos. 2,997,439, 3,035,889, and 3,097,926.

However, while the Stretford process has been relatively successful, it has been discovered that when used to treat hydrogenated Claus process tail gas, one of the principal constituents of the washing solution, anthraquinone disulfonate, is chemically consumed, which necessitates frequent addition of this expensive chemical to maintain the proper concentration of this constituent in the washing solution. This invention is directed to reducing the consumption of anthraquinone disulfonate (ADA) and to the improvement of the Stretford process when used to treat hydrogenated Claus process tail gas.

Accordingly, a principal object of this invention is to provide an improvement in the Stretford process for the removal of hydrogen sulfide from gases and its conversion to elemental sulfur.

Another object of this invention is to provide an improvement in the Stretford process when used to treat hydrogenated Claus process tail gas.

Yet another object of this invention is to reduce the excessive amounts of ADA consumed during the Stretford process when used to treat hydrogenated Claus process tail gas.

Further objects and advantages of this invention will be apparent to those skilled in the art from the following description.

SUMMARY OF THE INVENTION

According to the present invention, a hydrogen sulfide-containing hydrogenated Claus process tail gas is treated to convert the hydrogen sulfide to elemental sulfur by contacting the gas with an aqueous alkaline solution containing a water-soluble metal vanadate, a water-soluble anthraquinone disulfonate, and a water-soluble, inorganic fluoride, borate, or phosphate complexing agent to yield an effluent gas of reduced sulfur content. The solution is thereafter regenerated by contact with an oxygen-containing gas, elemental sulfur is recovered from the solution, and the regenerated solution is recycled to the gas-contacting step. The complexing agent reduces the chemical consumption of the anthraquinone disulfonate.

BRIEF DESCRIPTION OF THE DRAWING

The invention will be more readily understood by reference to the accompanying drawing which is a schematic flow diagram of the Stretford process illustrating the manner in which the hydrogenated Claus process tail gas is treated to convert hydrogen sulfide to elemental sulfur.

DETAILED DESCRIPTION

The Stretford process is used to treat hydrogenated Claus process tail gas by contacting the tail gas with an aqueous alkaline solution to produce an effluent gas of reduced sulfur content and to yield elemental sulfur; the solution is thereafter regenerated by contact with an oxygen-containing gas; the elemental sulfur is recovered from said solution; and the regenerated solution is recycled to the tail gas-contacting step.

The solution used in this process is an aqueous solution which has been made alkaline to a pH of above 7, and preferably between about 8.5 and 9.5, by the addition of alkalis such as caustic soda, caustic potash, ammonia; or sodium, potassium, or ammonium carbonates or bicarbonates; or organic bases such as alkanolamines. The preferred alkalis are sodium carbonate and bicarbonate, with sodium carbonate being the most preferred. A mixture of sodium carbonate and bicarbonate may also be used, such as a mixture of about 1 to 8 grams per liter sodium carbonate with about 10 to 30 grams per liter of sodium bicarbonate.

The solution also contains anthraquinone disulfonate (ADA), particularly the disodium salt. All the known isomers of ADA are suitable for use in this process. Also, mixtures of these isomers may be used with advantage, including commercially available mixtures which contain 1,5/1,8, 1,6/1,7, or 2,6/2,7 ADA and possibly small quantities of other isomers. Isomers 2,6 and 2,7 have a higher reactivity with sulfide and are preferred; but since the 2,7 isomer is more soluble in water, it is the most preferred material. The concentration of ADA in the solution, calculated as the disodium salt, can be as high as 6 grams per liter, but more preferably ranges from about 0.3 to 3 grams per liter, and most preferably about 2.5 grams per liter. Throughout this description, the concentration of ADA will be given in terms of the disodium salt.

The solution also contains vanadium in a water-soluble form; such as the metal or ammonium vanadates, including sodium metavanadate, sodium orthovanadate, sodium pyrovanadate, sodium ammonium vanadate or isopolyvanadate, or ammonium vanadate, with sodium metavanadate being preferred. The concentration of vanadium in the solution, calculated as the metal, should be no more than about 10 grams per liter, with the preferred range being 0.3 to 6 grams per liter; the optimum concentration depending on the volumetric flow rate of the gas and of the solution and the concentration of hydrogen sulfide in the gas being treated.

The drawing illustrates the operation of the Stretford process, wherein hydrogenated Claus process tail gas enters near the bottom of absorber 2. This tail gas typically contains about 1–3 mole percent hydrogen sulfide; about 2–20 mole percent carbon dioxide; traces of methane, water, carbonyl sulfide, carbon disulfide, elemental sulfur, carbon monoxide, methyl mercaptan, and the remainder nitrogen.

The tail gas flows upwardly through absorber 2, countercurrent to, and in intimate contact with the downflowing solution, which enters near the top of absorber 2. In most operations, a sodium carbonate solution is used to react with the hydrogen sulfide to form sodium hydrosulfide:

$$H_2S + Na_2CO_3 \rightarrow NaHS + NaHCO_3 \tag{1}$$

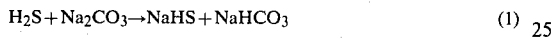

The hydrosulfide is oxidized to elemental sulfur by the water-soluble metal vanadate:

$$NaHS + NaHCO_3 + 2NaVO_3 \rightarrow S + Na_2V_2O_5 + Na_2CO_3 + H_2O \tag{2}$$

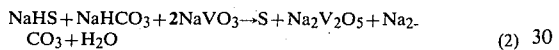

The solution then exits absorber 2 at the bottom thereof and enters reaction tank 4 where further and complete chemical conversion to elemental sulfur takes place. The residence time in reaction tank 4 typically varies between 10 and 15 minutes.

The sulfur-containing solution then exits reaction tank 4 and enters near the bottom of oxidizer 6. Air is admitted at the bottom of oxidizer 6 and is churned into small bubbles by a submerged, rotating stirrer-mixer (not shown) located above the air inlet. The solution, which was chemically reduced in absorber 2 and reaction tank 4, is now regenerated to its initial state. The vanadium, which has been reduced to the quadravalent state, is oxidized by oxygen back to its pentavalent state, using ADA as an oxidation catalyst:

$$Na_2V_2O_5 + \tfrac{1}{2} O_2 \xrightarrow{ADA} 2\,NaVO_3 \tag{3}$$

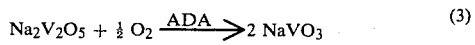

The solution then flows to balance tank 8 from where it is ready to be recycled. Elemental sulfur appears as a froth at the top of oxidizer 6, from where it is skimmed off, and then flowed to autoclave 12. The autoclave produces molten sulfur as a product and the recovered washing solution is directed back to balance tank 8 for recycling.

It has been discovered that when treating hydrogenated Claus process tail gas, the Stretford washing solution loses ADA. The ADA is consumed at rates approaching 6 percent or more of the ADA inventory per day, particularly when a fresh solution is first circulated. The magnitude of the problem can be fully appreciated when it is realized that a Stretford unit, employing 100,000 gallons of washing solution at an ADA concentration of 2.5 grams per liter, contains about 2,000 pounds of ADA. This means that at a loss rate of 6 percent per day, 120 pounds of ADA are consumed each day; and therefore necessitating the addition of 120 pounds of ADA each day.

While the exact mechanism is not known, it is now thought that the loss of ADA from the washing solution is due to oxidation, specifically oxidation by hydrogen peroxide in the presence of ferrous ions. Hydrogen peroxide is a strong oxidizing agent; and, in the presence of ferrous ions, the hydrogen peroxide produces Fenton's reagent, which is an even stronger oxidizing agent.

$$H_2O_2 + Fe^{++} \rightarrow Fe^{+++} + OH^- + OH\cdot(\text{Fenton's reagent}) \tag{4}$$

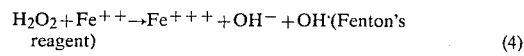

Although hydrogen peroxide has not been detected in the washing solution, it is believed to be produced during the oxidation step of the Stretford process; and ferrous ions have been detected in the solution at concentrations ranging up to 10 ppm and more. The likely source of the ferrous ions is corrosion of the steel process equipment. In the presence of hydrogen peroxide, a ferrous ion concentration as low as 1 ppm can prove detrimental to the ADA in the solution.

It has now been discovered that the addition to the washing solution of water-soluble, inorganic phosphate, borate, and fluoride complexing agents are particularly effective in rendering the ferrous ions unreactive in the presence of hydrogen peroxide.

The inorganic borates which can be used include various water-soluble monomeric borate salts, polymeric borate salts, boric acid, boric anhydride, and other borate compounds which yield monomeric or polymeric borate ions in an aqueous solution. Exemplary water-soluble, inorganic borates include:
sodium metaborate;
sodium metaborate tetrahydrate;
sodium tetraborate;
sodium tetraborate pentahydrate;
sodium tetraborate decahydrate;
boric acid; and
boric anhydride.

The inorganic fluorides that can be used include various water-soluble fluoride salts, hydrofluoric acid, and other fluoride compounds which yield fluoride ions in an aqueous solution. Exemplary water-soluble, inorganic fluorides of this invention include:
sodium fluoride; and
hydrofluoric acid.

The inorganic phosphates that can be used include various water-soluble, monomeric phosphate salts, polymeric phosphate salts, phosphoric acid, and phosphoric anhydride, and other phosphate compounds which yield monomeric or polymeric phosphate ions in an aqueous solution. Exemplary water-soluble, inorganic phosphates include:
sodium orthophosphate decahydrate;
sodium orthophosphate dodecahydrate;
sodium dihydrogen orthophosphate monohydrate;
sodium dihydrogen orthophosphate dihydrate;
sodium monohydrogen orthophosphate dihydrate;
sodium monohydrogen orthophosphate dodecahydrate;
phosphoric acid;
phosphoric anhydride;
commercial products containing mixtures of water-soluble, inorganic phosphates;
sodium hexametaphosphate;
sodium trimetaphosphate hexahydrate;
sodium pyrophosphate;
sodium pyrophosphate decahydrate;

sodium dihydrogen pyrophosphate hexahydrate;
sodium tripolyphosphate;
polyphosphoric acid; and
commercial products containing mixtures of water-soluble, inorganic polyphosphates.

If salts of the above inorganic borate, fluoride, or phosphate complexing agents are used, the sodium salt is preferred, although salts of other alkali metals, such as potassium, can also be used.

Of the inorganic complexing agents used in the practice of this invention, the phosphates are preferred, with the polymeric phosphates being more preferred, and sodium hexametaphosphate being particularly preferred.

The concentration of the complexing agent needed to provide adequate protection against the oxidation of ADA will depend on the concentration of the ADA, the hydrogen peroxide, and the ferrous ions in the washing solution, and on the effectiveness of the particular complexing agent used. It must be pointed out that since it is the anion of the water-soluble complexing agent that renders the ferrous ion unreactive, the concentration of the complexing agent in the washing solution will be stated in terms of its anion. If the concentrations of the hydrogen peroxide and the ferrous ions are low, it may only be necessary to use an amount of complexing agent sufficient to provide a complexing agent anion concentration of as low as about 0.001 grams per liter, or any effective amount to measurably reduce the consumption of ADA. However, it is preferred that the anion concentration be at least about 0.1 grams per liter to ensure adequate protection. The maximum concentration to be used will be determined more by economics than by any chemical requirements; however, it is not expected that an anion concentration of more than about 10 grams per liter will be needed to provide adequate protection for the ADA, and probably about 0.5 grams per liter would be adequate in most cases. Therefore, the concentration of the anion of the complexing agent can range between about 0.001 and about 10 grams per liter, with the preferred range being between about 0.1 and about 0.5 grams per liter.

The invention is further illustrated by the following examples which are illustrative of various aspects of the invention, and are not intended as limiting the scope of the invention as defined by the appended claims.

EXAMPLE 1

The following laboratory procedure is used to measure the effectiveness of the complexing agents used in this invention to reduce the oxidation loss of ADA in the presence of ferrous ions.

A 100 ml aqueous solution having an ADA concentration of 19 grams per liter and containing 0.01 weight percent ferrous chloride is prepared. To this solution is added 5 ml of a 30 volume percent solution of hydrogen peroxide. Then 2 grams of the complexing agent to be tested is admixed with the solution. If the complexing agent is an acid, it is neutralized to a pH of 7 before admixing it with the solution. The final solution is heated for 1 hour at 110° F., and then the ADA concentration of the solution, corrected for dilution, is determined. The corrected ADA concentration is termed the deactivating value of the complexing agent.

The following Table lists the results obtained when selected complexing agents are tested by the above-described procedure.

TABLE 1

| Complexing Agent | Deactivating Value |
| --- | --- |
| None | 6.6 |
| Boric acid | 17.6 |
| Hydrofluoric acid | 17.6 |
| Phosphonic acid | 18.5 |
| Sodium hexametaphosphate | 19.0 |

It is preferred that the complexing agents employed in the washing solution have a deactivating value of greater than about 17, and preferably greater than about 18.

EXAMPLE 2

The Stretford unit selected for testing is producing about 2 long tons of sulfur per day and contains about 100,000 gallons (378,541 liters) of solution. The unit is being fed hydrogenated tail gas from a Claus unit which is treated a hydrogen sulfide-containing gas. The approximate composition of the solution is 2.5 grams of ADA per liter, 2.3 grams of vanadium per liter, 12.5 grams of sodium bicarbonate per liter and 7.5 grams of sodium carbonate per liter. The pH of the solution is about 8.7. It is estimated that the solution is losing ADA at a rate of about 6 percent of the solution inventory per day. Sodium hexametaphosphate is selected as the complexing agent and about 488 kilograms, or about 1.29 grams of sodium hexametaphosphate per liter of solution, is added to the solution, so that the hexametaphosphate anion concentration becomes about 1 gram per liter. The ADA consumption rate is again measured and found to have decreased to about 1 percent per day.

Various embodiments and modifications of this invention have been described in the foregoing description, and further modifications will be apparent to those skilled in the art. Such modifications are included within the scope of this invention as defined by the following claims.

Having now described the invention, we claim:

1. In the process for treating a hydrogen sulfide-containing hydrogenated Claus process tail gas to convert the hydrogen sulfide to elemental sulfur in which said gas is contacted with an aqueous alkaline washing solution containing a water-soluble metal vanadate and a water-soluble anthraquinone disulfonate to yield an effluent gas of reduced sulfur content, the solution is thereafter regenerated by contact with an oxygen-containing gas, elemental sulfur is recovered from said solution, and said regenerated solution is recycled to said gas-contacting step, and in which said anthraquinone disulfonate is being chemically consumed, the improvement which comprises employing as said washing solution an aqueous alkaline solution containing a water-soluble metal vanadate, a water-soluble anthraquinone disulfonate, and an effective amount of a complexing agent for ferrous ions selected from the group consisting of water-soluble, inorganic phosphates, whereby chemical consumption of said anthraquinone disulfonate is substantially reduced.

2. The process defined in claim 1 wherein said complexing agent dissociates to provide an anion whose concentration in said aqueous alkaline solution is between about 0.001 and 10 grams per liter.

3. The process defined in claim 1 wherein the complexing agent has a deactivating value of greater than about 17.

4. In the process for treating a hydrogen sulfide-containing hydrogenated Claus process tail gas to convert the hydrogen sulfide to elemental sulfur in which said gas is contacted with an aqueous alkaline washing solution containing a water-soluble metal vanadate and a water-soluble anthraquinone disulfonate to yield an effluent gas of reduced sulfur content, the solution is thereafter regenerated by contact with an oxygen-containing gas, elemental sulfur is recovered from said solution, and said regenerated solution is recycled to said gas-contacting step, and in which said antraquinone disulfonate is being chemically consumed, the improvement which comprises employing as said washing solution an aqueous alkaline solution containing a water-soluble metal vanadate, a water-soluble anthraquinone disulfonate, and a complexing agent for ferrous ions selected from the group consisting of water-soluble, inorganic phosphates having a deactivating value greater than about 17, and wherein said complexing agent dissociates to provide an anion whose concentration in said solution is between about 0.1 and 0.5 grams per liter, whereby chemical consumption of said anthraquinone disulfonate is substantially reduced.

5. The process defined in claim 1 or 4 wherein said complexing agent is sodium hexametaphosphate.

* * * * *